(12) United States Patent
Wang et al.

(10) Patent No.: US 12,733,624 B1
(45) Date of Patent: Sep. 15, 2026

(54) LARGE-CAPACITY DUAL-TANK PET WATER DISPENSER AND AUTOMATIC WATER REFILLING METHOD THEREFOR

(71) Applicant: Shenzhen Qianhai Runway Technology Co., LTD., Shenzhen (CN)

(72) Inventors: Jing Wang, Shenzhen (CN); Haobo Chen, Shenzhen (CN); Zhenqiang He, Shenzhen (CN)

(73) Assignee: SHENZHEN QIANHAI RUNWAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 19/530,240

(22) Filed: Feb. 4, 2026

(51) Int. Cl.
*A01K 7/02* (2006.01)

(52) U.S. Cl.
CPC ................ *A01K 7/025* (2013.01); *A01K 7/02* (2013.01)

(58) Field of Classification Search
CPC ........... A01K 7/02; A01K 7/022; A01K 7/025
USPC ..................................................... 119/72, 74
See application file for complete search history.

(56) References Cited

U.S. PATENT DOCUMENTS

| | | | | |
|---|---|---|---|---|
| 4,130,090 A * | 12/1978 | Bohlmann | ............... | A01K 7/04 119/73 |
| 8,117,991 B1 * | 2/2012 | Civitillo | ................. | A01K 7/027 119/72 |
| 8,381,685 B2 * | 2/2013 | Lipscomb | ............... | A01K 7/02 119/74 |
| 11,510,392 B2 * | 11/2022 | Sayers | ................... | A01K 7/022 |
| 12,433,251 B2 * | 10/2025 | Wei | ......................... | C02F 1/003 |
| 2021/0176958 A1 * | 6/2021 | Wu | ........................ | B01D 29/05 |

FOREIGN PATENT DOCUMENTS

CN 210054239 * 2/2020

* cited by examiner

*Primary Examiner* — David J Parsley
(74) *Attorney, Agent, or Firm* — Frank Niranjan

(57) ABSTRACT

The present disclosure provides a large-capacity dual-tank pet water dispenser and an automatic water refilling method therefor. The large-capacity dual-tank pet water dispenser includes: a circulating water tank, where the circulating water tank defines a first water storage chamber having a first upper opening, and a water tray is disposed at the first upper opening and provided with a water outlet hole and a drain hole; and a first water pump is disposed at a bottom of the first water storage chamber, and a water outlet of the first water pump is in communication with the water outlet hole via a first water supply pipe; and a purified water tank, detachably connected to one side of the circulating water tank. The present disclosure effectively solves the problems of insufficient capacity, frequent manual water refilling, poor clean-dirty separation, and the like in an existing pet water dispenser.

8 Claims, 13 Drawing Sheets

LARGE-CAPACITY DUAL-TANK PET WATER DISPENSER AND AUTOMATIC WATER REFILLING METHOD THEREFOR

TECHNICAL FIELD

The present disclosure relates to the technical field of pet supplies, and specifically to a large-capacity dual-tank pet water dispenser and an automatic water refilling method therefor.

BACKGROUND

With the improvement of residents' living standards and the upgrading of emotional needs, pet keeping has become a common lifestyle. Medium and large dogs, with their loyal and gentle temperament, have become important members of many families. However, the medium and large dogs differ significantly from small pets in their physiological characteristics. They typically weigh between 20-50 kg, or even more, and their daily water intake can reach 1-5 L, which is far higher than the water needs of the small pets.

Although there is a wide variety of pet water dispensers available on the market, the mainstream products typically have a capacity of 4-8 L, which still makes it difficult to meet the long-term water needs of the medium and large dogs in practical use. Taking a single adult Golden Retriever as an example, its daily water intake is approximately 2-4 L. Most existing water dispensers can only support 1-3 days of usage, requiring frequent manual water refilling by a keeper. For keepers who frequently travel, work overtime, or go out for short periods, the need for frequent water refilling not only brings great inconvenience, but may also lead to the risk of water shortage for pets due to oversight, seriously affecting the health and quality of life of the pets.

In addition to insufficient capacity, some pet water dispensers in the prior art adopt a swirling water flow design to enhance drinking interest of pets. However, such products generally lack a water storage system with sufficient capacity and do not offer an automatic water refilling function, making it impossible to simultaneously meet both the preference for flowing water and the need for long-term drinking water supply. The market lacks an integrated pet water dispenser with an independent water refilling tank. Relying solely on a single water tank for water storage not only limits the total capacity but also makes it difficult to separate purified water from circulating water, leading to water quality deterioration and bacterial growth, which in turn affects the safety of drinking water for pets.

Therefore, there is an urgent need to design a large-capacity and automatic water refilling pet water dispenser.

SUMMARY

An objective of the present disclosure is to provide a large-capacity dual-tank pet water dispenser and an automatic water refilling method therefor, so as to solve the problems of insufficient capacity, frequent manual water refilling, poor clean-dirty separation, and the like in an existing pet water dispenser.

The technical solutions of the present disclosure are as follows:

In a first aspect, the present disclosure provides a large-capacity dual-tank pet water dispenser, including:

a circulating water tank, where the circulating water tank defines a first water storage chamber having a first upper opening, and a water tray is disposed at the first upper opening and provided with a water outlet hole and a drain hole; and a first water pump is disposed at a bottom of the first water storage chamber and integrated with a water shortage sensor, and a water outlet of the first water pump is in communication with the water outlet hole via a first water supply pipe; and a purified water tank, detachably connected to one side of the circulating water tank, where the purified water tank defines a second water storage chamber having a second upper opening, the second upper opening is covered by an upper cover, a second water pump and a control board are disposed inside the upper cover, and the control board is configured to control start and stop of the first water pump and the second water pump; a water inlet of the second water pump is connected to a second water supply pipe, and one end of the second water supply pipe away from the second water pump extends to a bottom of the second water storage chamber; one side of the upper cover facing the circulating water tank is provided with a water outlet structure, and a water outlet of the second water pump is in communication with the water outlet structure; and upon receiving a water shortage signal sent by the water shortage sensor, the control board controls the second water pump to start and operate continuously for a first preset duration, such that water stored in the second water storage chamber is delivered to the first water storage chamber sequentially via the second water supply pipe and the water outlet structure.

As a preferred solution of the present disclosure, a water-pouring opening is formed in a middle portion of the upper cover, a movable cover is disposed at the water-pouring opening, and a rear side of the movable cover is rotatably connected to a rear side of a top of the upper cover to enable opening or sealing of the water-pouring opening.

As a preferred solution of the present disclosure, a cover plate accommodating groove is formed in a position of the top of the upper cover corresponding to the movable cover and is in communication with the water-pouring opening; and when the movable cover is rotated into the cover plate accommodating groove, a top of the movable cover is flush with the top of the upper cover.

As a preferred solution of the present disclosure, a front side of the movable cover extends downward to form a front engaging portion; and when the movable cover seals the water-pouring opening, the front engaging portion covers the water outlet structure and forms an engaging cavity together with a front wall of the purified water tank in a surrounding manner, and the engaging cavity is adaptively engaged with a rear wall of the circulating water tank.

As a preferred solution of the present disclosure, the water outlet structure is provided with a water outlet channel, a water inlet of the water outlet channel is in communication with the water outlet of the second water pump via a water outlet pipe, and a water outlet of the water outlet channel faces the circulating water tank.

As a preferred solution of the present disclosure, a battery is further disposed inside the upper cover, one side of the upper cover is provided with a power supply interface, and the control board is respectively electrically connected to the battery and the power supply interface.

As a preferred solution of the present disclosure, the upper cover is formed by combining an upper housing with a lower housing.

As a preferred solution of the present disclosure, the upper cover is provided with a water refilling button, and the water refilling button is electrically connected to the control board;

when the water refilling button is triggered, the control board controls the second water pump to start and operate continuously for a second preset duration; and when the water refilling button is triggered again within the second preset duration, the control board controls the second water pump to stop operating.

As a preferred solution of the present disclosure, the water refilling button is located in the cover plate accommodating groove.

As a preferred solution of the present disclosure, a filter cartridge tray is disposed below the water tray, and an overflow channel is formed between the filter cartridge tray and the water tray; and a filter cartridge slot is formed in a middle portion of the filter cartridge tray, a filter cartridge is detachably mounted in the filter cartridge slot, a first through hole in communication with the first water storage chamber is formed in a bottom of the filter cartridge slot, filter cotton is detachably mounted in the first through hole, and a lower end of the filter cotton extends to a lower end inside the first water storage chamber.

As a preferred solution of the present disclosure, several support plates for supporting the filter cartridge tray are circumferentially disposed on an inner wall of the circulating water tank.

As a preferred solution of the present disclosure, a connecting slot is further formed in the middle portion of the filter cartridge tray, and the filter cartridge slot is formed in a bottom of the connecting slot; and a connecting peripheral plate is protrudingly disposed at a bottom of the water tray and adapted to the connecting slot.

As a preferred solution of the present disclosure, a side wall of the circulating water tank extends upward along an edge of the first upper opening to form a splash-proof flange.

As a preferred solution of the present disclosure, a mounting positioning plate is disposed between a bottom of the circulating water tank and a bottom of the purified water tank.

In a second aspect, the present disclosure provides an automatic water refilling method for a large-capacity dual-tank pet water dispenser, applied to the large-capacity dual-tank pet water dispenser according to any one of solutions above, and including the following steps:

step S1: injecting sufficient water into the first water storage chamber and the second water storage chamber, closing the upper cover, and supplying power to the control board via a power supply interface or a battery;

step S2: detecting, by a water shortage sensor on the first water pump, a water level in the first water storage chamber in real time, and sending a water shortage signal to the control board by the water shortage sensor when the water level falls below a preset threshold;

step S3: upon receiving the water shortage signal, outputting, by the control board, a drive command to control the second water pump to start and operate continuously for a first preset duration; and delivering water in the second water storage chamber to the first water storage chamber via the second water supply pipe and the water outlet structure; and step S4: when an operating duration of the second water pump reaches the first preset duration, outputting, by the control board, a stop command to control the second water pump to stop operating.

As a preferred solution of the present disclosure, the method further includes the following step:

step S5: when a water refilling button is triggered, controlling, by the control board, the second water pump to start and operate continuously for a second preset duration; and when the water refilling button is triggered again within the second preset duration, controlling, by the control board, the second water pump to stop operating.

Compared with the prior art, the present disclosure has the following beneficial effects:

1. Through combined design of the circulating water tank and the purified water tank, the present disclosure effectively increases the total water storage capacity, meets the long-term drinking requirements of medium and large dogs, reduces the frequency of manual water refilling by a keeper, and avoids the risk of water shortage for a pet due to the absence of the keeper.

2. The water shortage sensor integrated on the first water pump is used to detect the water level in real time. When the water level falls below the preset threshold, the control board automatically controls the second water pump to operate, thereby achieving automatic replenishment of purified water without manual intervention and greatly improving the convenience of use.

3. In addition to automatic water replenishment, a user can manually replenish water by triggering the water refilling button, with support for stopping midway, thereby meeting diverse water replenishment requirements.

4. By disposing the filter cartridge tray below the water tray, circulating water is filtered and purified. Moreover, the separate design of the purified water tank and the circulating water tank prevents mixing of the purified water and the circulating water, thereby ensuring the safety of drinking water for the pet.

BRIEF DESCRIPTION OF THE DRAWINGS

To more clearly illustrate the technical solutions in the embodiments of the present disclosure, the accompanying drawings that need to be used in the description of the embodiments or the prior art will be briefly introduced below. Apparently, the accompanying drawings in the description below merely illustrate some embodiments of the present disclosure. Those of ordinary skill in the art may also derive other accompanying drawings from these accompanying drawings without creative efforts.

In the drawings.

Figure 1:
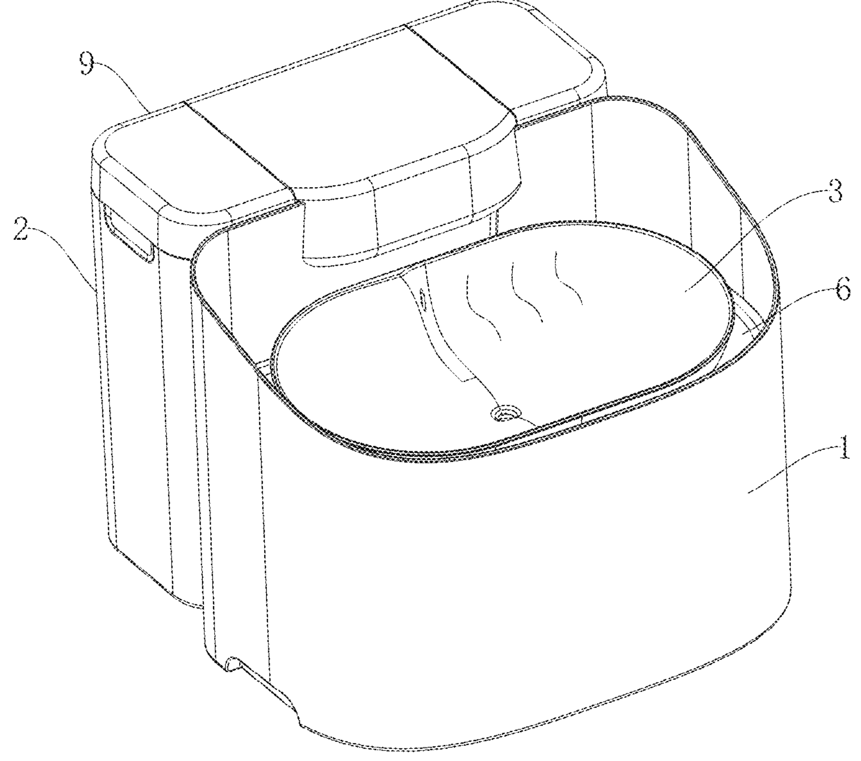
FIG. 1 is a schematic structural diagram of a large-capacity dual-tank pet water dispenser in the present disclosure.
Figure 2:
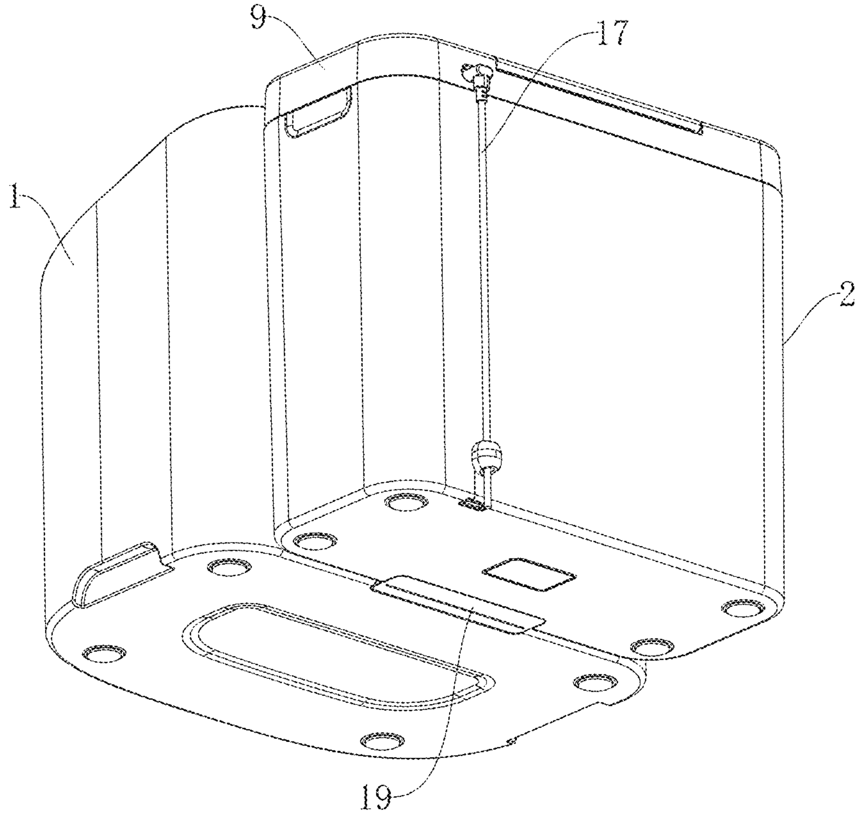
FIG. 2 is a schematic structural diagram of a large-capacity dual-tank pet water dispenser in the present disclosure from another perspective.

1: circulating water tank; 101: first water storage chamber; 1011: first upper opening; 102: support plate; 103: splash-proof flange; 104: third engaging portion; 2: purified water tank; 201: second water storage chamber; 2011: second upper opening; 202: fourth engaging portion; 3: water tray; 301: water outlet hole; 302: drain hole; 303: flow-retarding protrusion; 304: connecting peripheral plate; 4: first water pump; 401: water shortage sensor; 5: first water supply pipe; 6: filter cartridge tray; 601: filter cartridge slot; 6011: first through hole; 602: connecting slot; 7: filter cartridge; 8: filter cotton; 9: upper cover; 901: water-pouring opening; 902: movable cover; 9021: front engaging portion; 903: cover plate accommodating groove; 904: engaging cavity; 905: upper housing; 906: lower housing; 10: second water pump; 11: control board; 12: second water supply pipe; 13: water outlet structure; 1301: water outlet channel; 14: water outlet pipe; 15: battery; 16: power supply interface; 17: power cord; 18: water refilling button; 19: mounting positioning plate; 1901: first engaging portion; and 1902. second engaging portion.

DETAILED DESCRIPTION OF THE EMBODIMENTS

To make the technical problems to be solved by the present disclosure and the technical solutions and beneficial effects of the present disclosure clearer, the present disclosure will be further described in detail below with reference to the accompanying drawings and the embodiments. It should be noted that similar reference numerals and letters represent similar items in the following accompanying drawings. Therefore, once an item is defined in an accompanying drawing, it is not required to be further defined and explained in the subsequent accompanying drawings. It is hereby declared that the embodiments described below are only used to explain the present disclosure and are not intended to limit the present disclosure.

It should be noted that the terms such as "mount", "dispose", "connection", and "fix" should be understood in a broad sense. For example, it may be a fixed connection, a detachable connection, or being integrated; it may be a mechanical connection or an electrical connection; and it may be being directly connected, being indirectly connected via an intermediate medium, a communication between the interiors of two elements, or an interaction between two elements, unless otherwise expressly limited. The indicated orientations or positional relationships are based on the orientations or positional relationships shown in the accompanying drawings, customary orientations or positional relationships when the product in this application is in use, or orientations or positional relationships customarily understood by those skilled in the art, only for the convenience of describing the present application and simplifying the description rather than indicating or implying that the apparatus or element referred to must have a particular orientation or be constructed and operated in a particular orientation, and therefore cannot be construed as limitations to the present application.

As shown in FIG. 1 to FIG. 12, this embodiment provides a large-capacity dual-tank pet water dispenser, including a circulating water tank 1 and a purified water tank 2, where the purified water tank 2 is detachably connected to one side of the circulating water tank 1.

Figure 4:
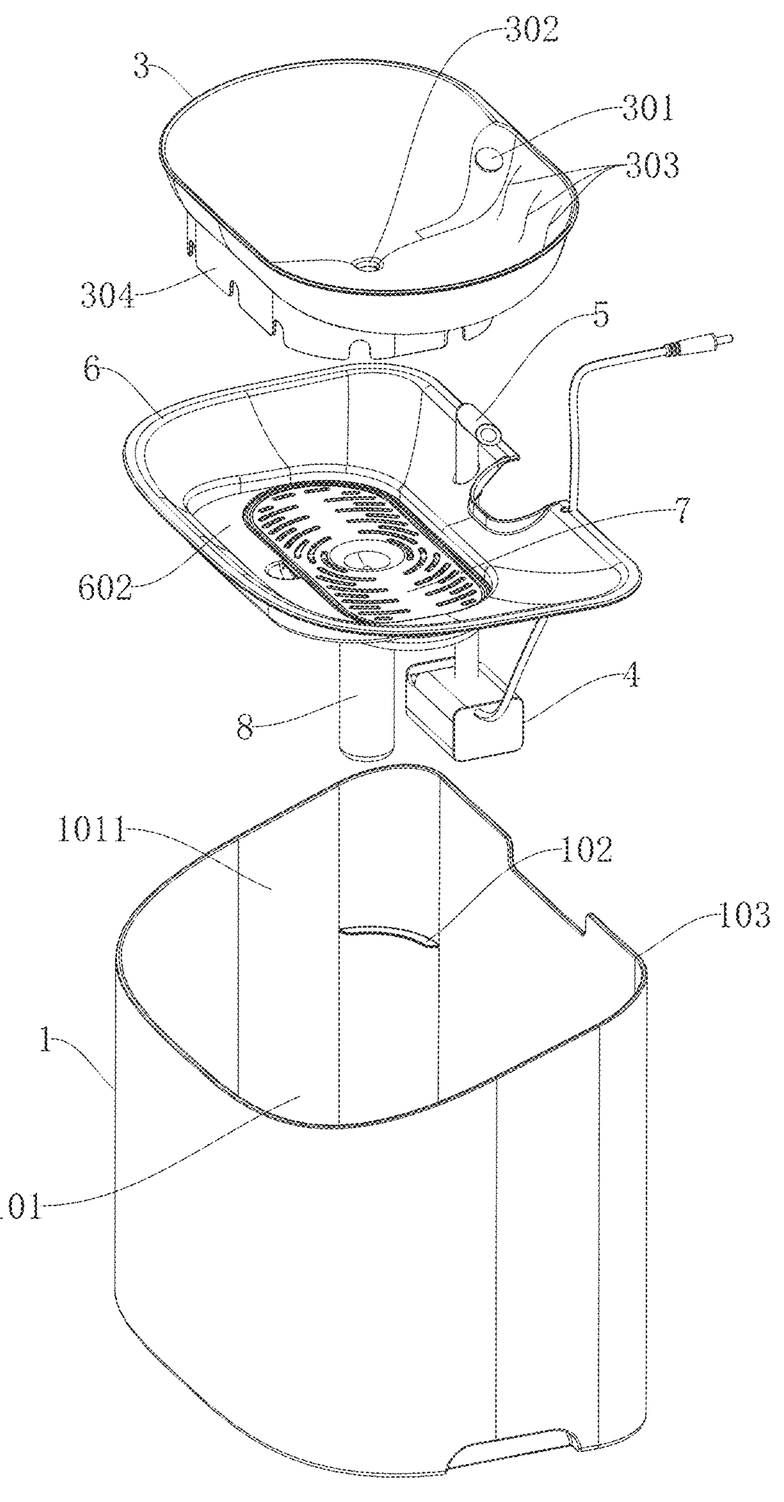
FIG. 4 is an exploded view of components inside a circulating water tank in the present disclosure.

As shown in FIG. 4, the circulating water tank 1 defines a first water storage chamber 101 having a first upper opening 1011, a water tray 3 is disposed at the first upper opening 1011, a water outlet hole 301 is formed in a wall of the water tray 3, a drain hole 302 is formed in a center of a bottom of the water tray 3, and an arrangement height of the water outlet hole 301 is greater than that of the drain hole 302; a plurality of flow-retarding protrusions 303 distributed at intervals are protrudingly disposed on an inner wall of the water tray 3, the drain hole 302 is opened transversely toward the flow-retarding protrusions 303, and the drain hole 302 is disposed adjacent to the flow-retarding protrusions 303; and a first water pump 4 is disposed at a bottom of the first water storage chamber 101 and integrated with a water shortage sensor 401, and a water outlet of the first water pump 4 is in communication with the water outlet hole 301 via a first water supply pipe 5. In this embodiment, after being started, the first water pump 4 can deliver water stored in the first water storage chamber 101 to the water tray 3 via the first water supply pipe 5 and the water outlet hole 301, for a pet to drink the water in the water tray 3. Since the water outlet hole 301 is opened transversely, a water flow is transversely sprayed onto the inner wall of the water tray 3 under water supply pressure of the first water pump 4 to form a swirling water flow, which conforms to the preference of the pet for flowing water and enhances its drinking interest. The swirling water flow can drive impurities in the water tray 3 to gather toward the center, thereby facilitating the entry of the impurities into a filtration structure via the drain hole 302, and reducing residual impurities in the water tray 3. Since the drain hole 302 is formed in the center of the bottom of the water tray 3, the water in the water tray 3 can completely flow back to the first water storage chamber 101 via the drain hole 302, such that the water tray 3 does not store the water. The flow-retarding protrusions 303 can block and reduce a flow velocity of the water sprayed from the water outlet hole 301, thereby preventing splashing and noise caused by the excessively fast water flow, and improving the quietness and splash-proof effect of the product during use. The water shortage sensor 401 is integrated with the first water pump 4 in design and can detect a water level in the first water storage chamber 101 in real time, thereby providing an accurate trigger signal for automatic water replenishment.

Figure 6:
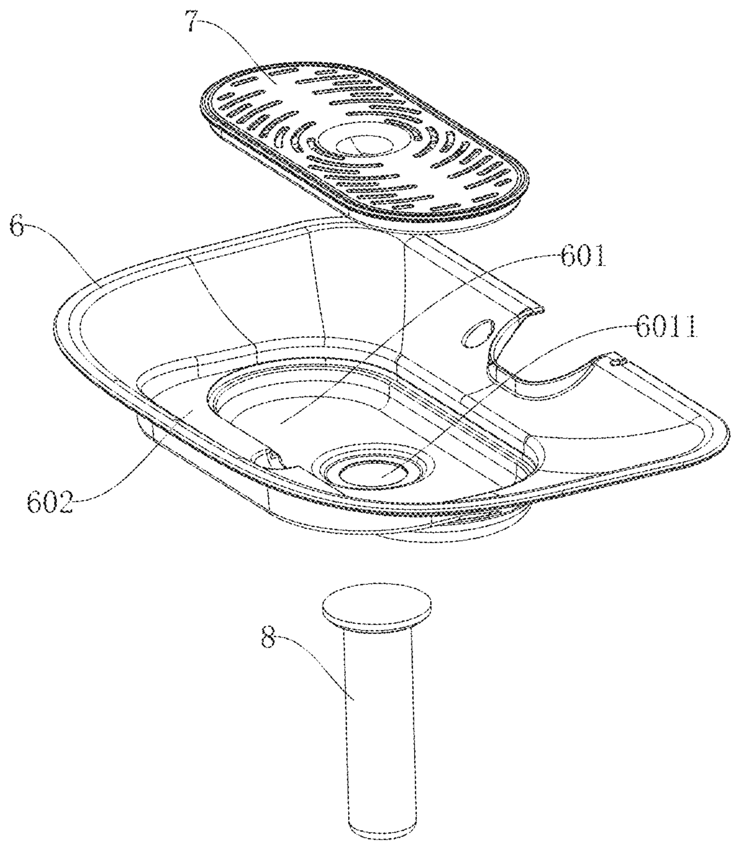
FIG. 6 is an exploded view of a filter cartridge tray in the present disclosure.
Figure 7:
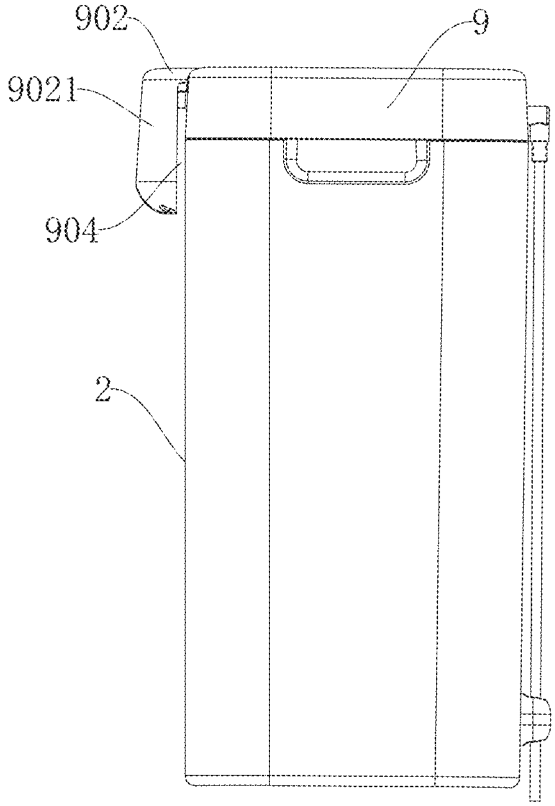
FIG. 7 is a side view of a purified water tank and an upper cover in the present disclosure.

As shown in FIG. 4 and FIG. 6, a filter cartridge tray 6 is disposed below the water tray 3, several support plates 102 for supporting the filter cartridge tray 6 are circumferentially disposed on an inner wall of the circulating water tank 1, and an overflow channel is formed between the filter cartridge tray 6 and the water tray 3. A filter cartridge slot 601 is formed in a middle portion of the filter cartridge tray 6, a filter cartridge 7 is detachably mounted in the filter cartridge slot 601, a first through hole 6011 in communication with the first water storage chamber 101 is formed in a bottom of the filter cartridge slot 601, filter cotton 8 is detachably mounted in the first through hole 6011, and a lower end of the filter cotton 8 extends to a lower end inside the first water storage chamber 101. In this embodiment, the first water pump 4 provides continuous power for the swirling water flow in the water tray 3 to ensure a stable water flow pattern, while driving circulating water to flow back to the first water storage chamber 101 after being filtered by the filter cartridge tray 6, thereby forming a closed-loop cycle of water supply, drinking, filtration, and return. The overflow channel formed between the filter cartridge tray 6 and the water tray 3 can receive the circulating water overflowing from the water tray 3, thereby preventing the circulating water from directly dripping outside the water tank. Moreover, a buffering effect of the overflow channel allows the water flow to be evenly distributed on a surface of the filter cartridge 7, thereby improving the filtration efficiency. The filter cartridge 7 (such as PP cotton+activated carbon+antibacterial particles) and the filter cotton 8 form a dual-filtration structure, which can efficiently filter hair and impurities, prevent bacterial growth, greatly improve the cleanliness of the circulating water, and reduce the risk of the pet developing gastrointestinal diseases from drinking unclean water. Since the filter cartridge 7 is detachably mounted in the filter cartridge slot 601 and the filter cotton 8 is detachably mounted in the first through hole 6011, it is convenient for a keeper to periodically remove, clean, or replace them, thereby providing high maintenance convenience. Moreover, the filter cotton 8 extends to the lower end inside the first water storage chamber 101, enabling secondary interception of impurities deposited at a bottom of the circulating water tank 1.

As shown in FIG. 4 and FIG. 6, a connecting slot 602 is further formed in the middle portion of the filter cartridge tray 6, and the filter cartridge slot 601 is formed in a bottom of the connecting slot 602; and a connecting peripheral plate 304 is protrudingly disposed at the bottom of the water tray 3 and adapted to the connecting slot 602, thereby facilitating the mounting and dismounting between the water tray 3 and the filter cartridge tray 6, and preventing the water tray 3 from being displaced due to pet collision during drinking.

As shown in FIG. 4, a side wall of the circulating water tank 1 extends upward along an edge of the first upper opening 1011 to form a splash-proof flange 103, which effectively prevents water from splashing out of the circulating water tank 1 and wetting the floor when the pet drinks, thereby improving the cleanliness of the product during use.

As shown in FIG. 6 to FIG. 10 and FIG. 12, the purified water tank 2 defines a second water storage chamber 201 having a second upper opening 2011, the second upper opening 2011 is covered by an upper cover 9, a second water pump 10 and a control board 11 are disposed inside the upper cover 9, both the first water pump 4 and the second water pump 10 are electrically connected to the control board 11, and the control board 11 is configured to control start and stop of the first water pump 4 and the second water pump 10; a water inlet of the second water pump 10 is connected to a second water supply pipe 12, and one end of the second water supply pipe 12 away from the second water pump 10 extends to a bottom of the second water storage chamber 201; and one side of the upper cover 9 facing the circulating water tank 1 is provided with a water outlet structure 13, and a water outlet of the second water pump 10 is in communication with the water outlet structure 13. Upon receiving a water shortage signal sent by the water shortage sensor 401, the control board 11 controls the second water pump 10 to start and operate continuously for a first preset duration, such that water stored in the second water storage chamber 201 is delivered to the first water storage chamber 101 sequentially via the second water supply pipe 12 and the water outlet structure 13, thereby achieving automatic control of water replenishment upon water shortage without manual intervention. The water outlet structure 13 is disposed facing the circulating water tank 1, which can ensure that a replenishment water flow accurately enters the water tray 3, thereby preventing splashing of the water flow during water replenishment. The second water supply pipe 12 extends to the bottom of the second water storage chamber 201, which allows full utilization of purified water in the purified water tank 2 and reduces residual purified water. The control board 11 integrates control logic for the first water pump 4 and the second water pump 10, which not only drives the first water pump 4 to achieve circulating water supply, but also controls the second water pump 10 to perform automatic water replenishment according to the water shortage signal from the water shortage sensor 401. The dual pumps work cooperatively to realize functional linkage between the circulating water supply and the automatic water replenishment, thereby improving the intelligence level of the product.

Figure 3:
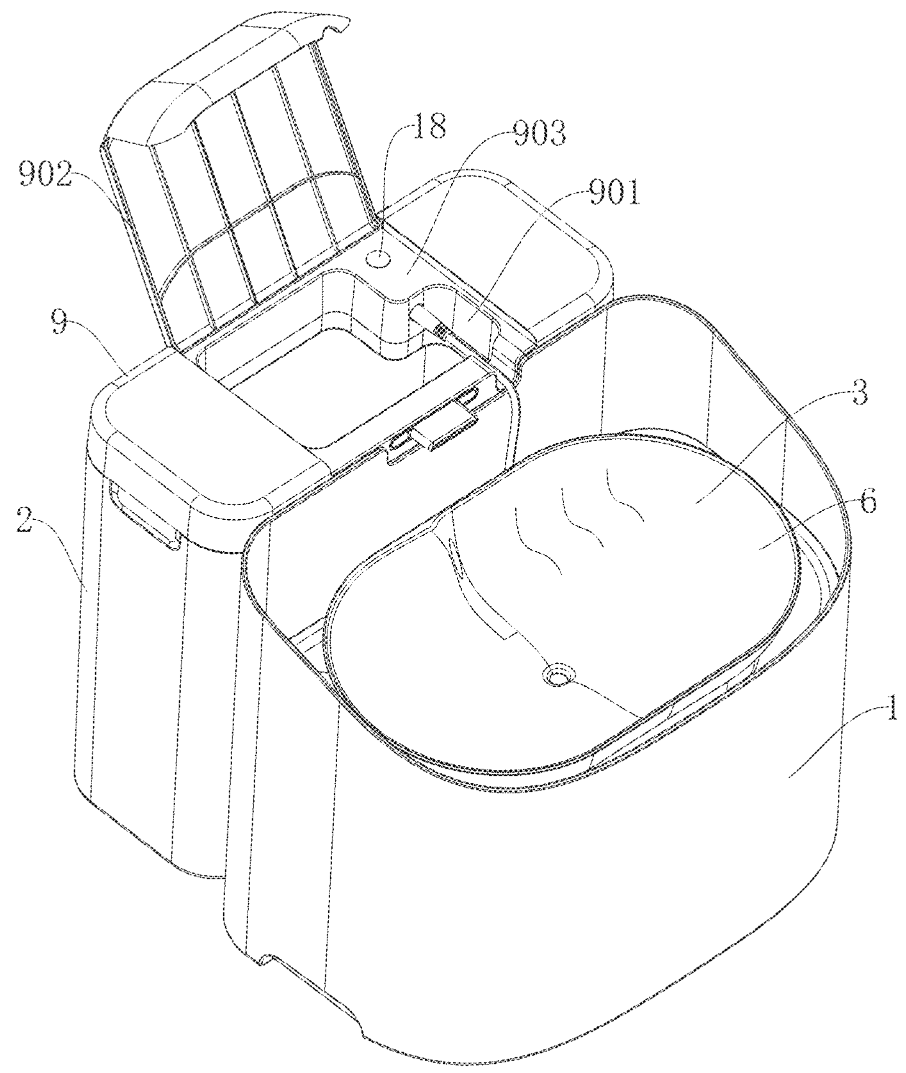
FIG. 3 is a schematic structural diagram of a large-capacity dual-tank pet water dispenser with a movable cover opened in the present disclosure.
Figure 9:
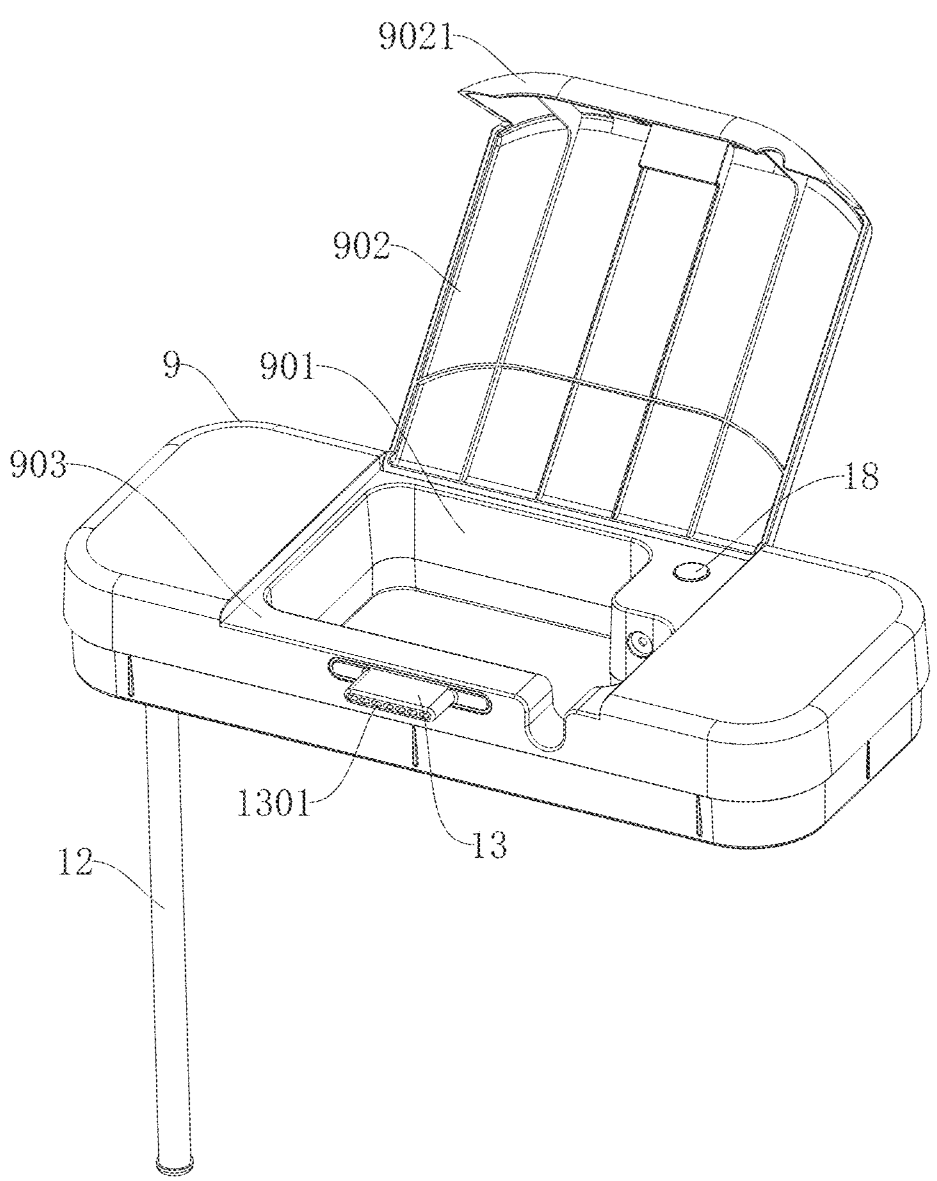
FIG. 9 is a schematic structural diagram of an upper cover with a movable cover opened in the present disclosure.
Figure 10:
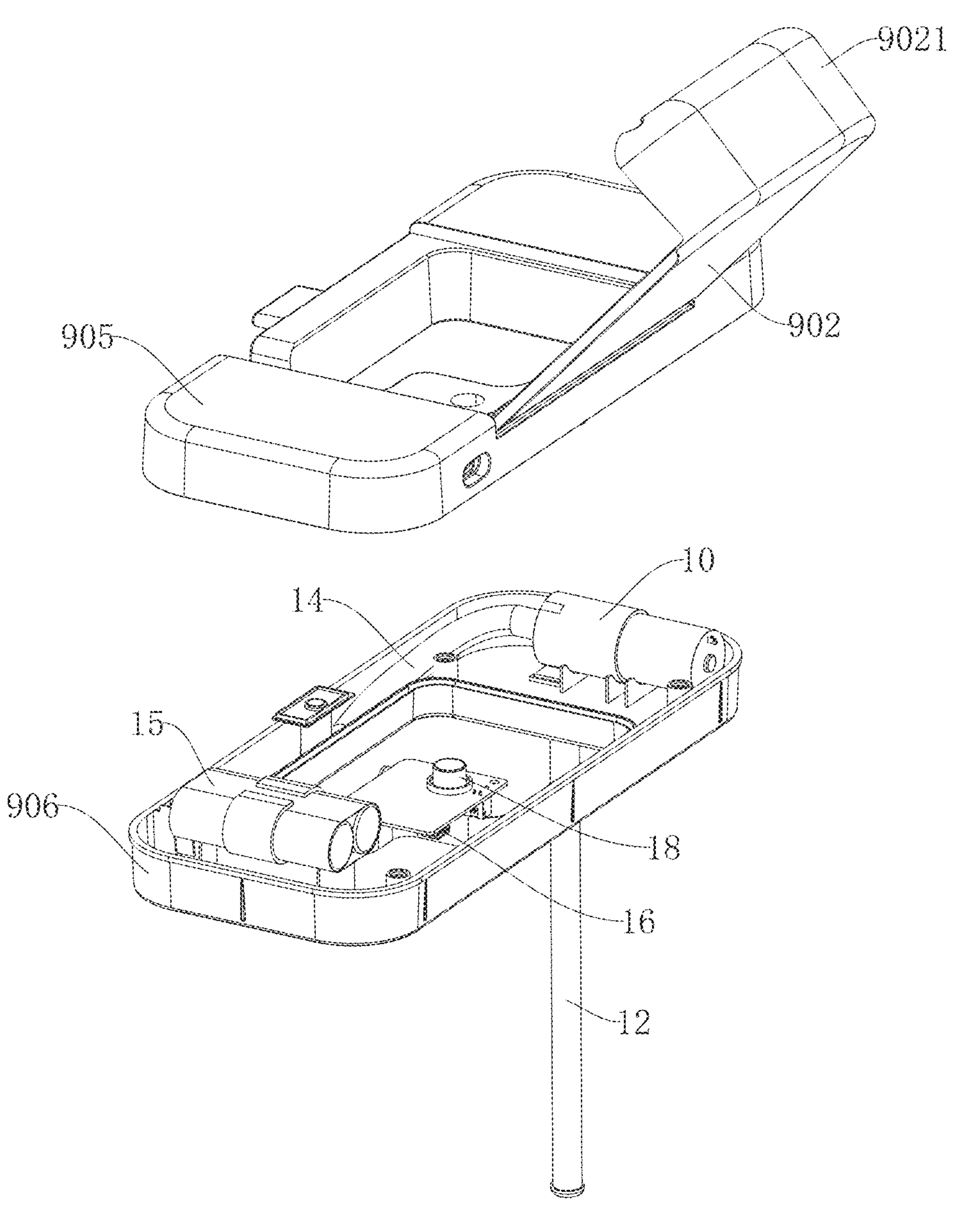
FIG. 10 is an exploded view of an upper cover with a movable cover opened in the present disclosure.

As shown in FIG. 3, FIG. 9, and FIG. 10, a water-pouring opening 901 is formed in a middle portion of the upper cover 9, such that an independent channel is provided for replenishing water in the purified water tank 2, and the second water storage chamber 201 can be directly filled with purified water without removing the upper cover 9, thereby simplifying the water refilling process and improving the convenience of use. A movable cover 902 is disposed at the water-pouring opening 901, and a rear side of the movable cover 902 is rotatably connected to a rear side of a top of the upper cover 9 to enable opening or sealing of the water-pouring opening 901, thereby preventing hair, dust, and other impurities from falling into the second water storage chamber 201 of the purified water tank 2 during pet drinking, and ensuring the cleanliness of the reserved purified water. A cover plate accommodating groove 903 is formed in a position of the top of the upper cover 9 corresponding to the movable cover 902 and is in communication with the water-pouring opening 901; and when the movable cover 902 is rotated into the cover plate accommodating groove 903, a top of the movable cover 902 is flush with the top of the upper cover 9, thereby achieving concealed storage of the movable cover 902, eliminating the need to provide an additional space for placing the movable cover 902, and making the upper cover 9 more compact in structure. A front side of the movable cover 902 extends downward to form a front engaging portion 9021; and when the movable cover 902 seals the water-pouring opening 901, the front engaging portion 9021 covers the water outlet structure 13 and forms an engaging cavity 904 together with a front wall of the purified water tank 2 in a surrounding manner, and the engaging cavity 904 is adaptively engaged with a rear wall of the circulating water tank 1, thereby achieving lateral fixation between the purified water tank 2 and the circulating water tank 1, and effectively preventing relative displacement or separation of the two water tanks caused by pet collision. Moreover, the convenience of connecting and separating the circulating water tank 1 and the purified water tank 2 is improved by virtue of quick assembly and disassembly characteristics of an engaging structure. When the water outlet structure 13 discharges water, the water flows along a gap between a rear wall of the front engaging portion 9021 and the front wall of the purified water tank 2 into the first water storage chamber 101 of the circulating water tank 1, thereby ensuring quiet, splash-free, stable, and reliable water refilling.

As shown in FIG. 9 and FIG. 10, the water outlet structure 13 is provided with a water outlet channel 1301, a water inlet of the water outlet channel 1301 is in communication with the water outlet of the second water pump 10 via a water outlet pipe 14, and a water outlet of the water outlet channel 1301 faces the circulating water tank 1, thereby ensuring that the purified water delivered by the second water pump 10 accurately flows into the water tray 3, preventing splashing of the water flow outside the water tank during water replenishment, and improving the cleanliness of the water replenishment process. The water outlet channel 1301 is integrated inside the water outlet structure 13 instead of using an exposed water delivery pipe, thereby simplifying an outer structure of the upper cover 9, avoiding water leakage caused by pipe aging or damage, and improving the durability of the product.

Figure 12:
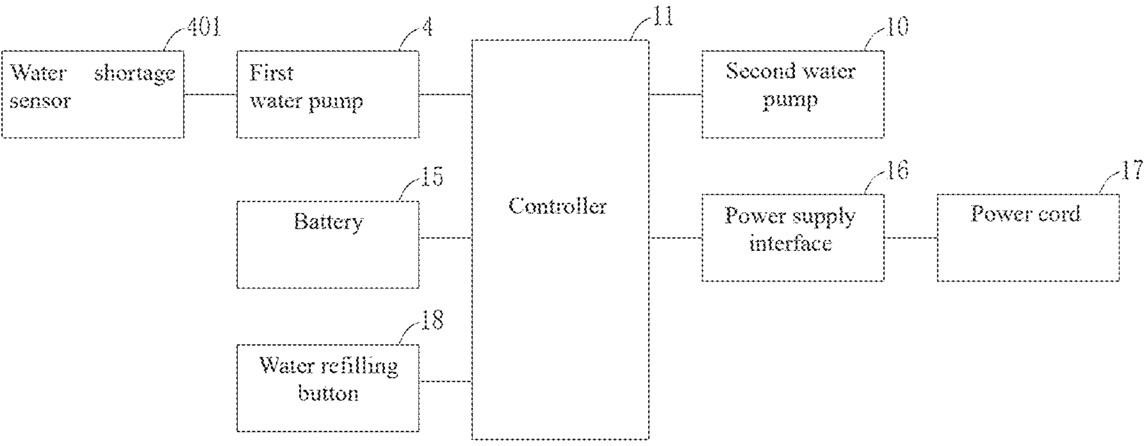
FIG. 12 is a block diagram illustrating the working principle of a large-capacity dual-tank pet water dispenser in the present disclosure.

As shown in FIG. 10 and FIG. 12, a battery 15 is further disposed inside the upper cover 9, one side of the upper cover 9 is provided with a power supply interface 16, and the control board 11 is respectively electrically connected to the battery 15 and the power supply interface 16. The power supply interface 16 can be connected to mains power via a power cord 17 to achieve mains power supply. When a household power outage occurs or the water dispenser needs to be moved, the battery 15 can ensure normal operation of the control board 11, the first water pump 4, and the second water pump 10, thereby preventing the pet from being unable to drink water due to power failure.

As shown in FIG. 10, the upper cover 9 is formed by combining an upper housing 905 with a lower housing 906, and adopts a split structure, which facilitates mounting, debugging, and maintenance of the components (the second water pump 10, the control board 11, and the battery 15) inside the upper cover 9. When an internal component malfunctions, only the upper housing and the lower housing 906 need to be disassembled for inspection and repair without replacing the entire upper cover 9, thereby reducing maintenance costs.

As shown in FIG. 3, FIG. 9, FIG. 10, and FIG. 12, the upper cover 9 is provided with a water refilling button 18, and the water refilling button 18 is electrically connected to the control board 11; when the water refilling button 18 is triggered, the control board 11 controls the second water pump 10 to start and operate continuously for a second preset duration; and when the water refilling button 18 is triggered again within the second preset duration, the control board 11 controls the second water pump 10 to stop operating. In this embodiment, in addition to an automatic water replenishment mode, a manual water replenishment mode is further provided to meet personalized water replenishment requirements of a user (such as scenarios where the water consumption of the pet suddenly increases or rapid water replacement is required). Through a logic design of triggering to start and triggering again to stop, the duration of manual water replenishment can be flexibly controlled, thereby preventing overflow of the water in the water tray 3 due to excessive water replenishment, and improving operational accuracy. Moreover, linkage control between the water refilling button 18 and the control board 11 shares the second water pump 10 and the water outlet structure 13 with automatic water refilling logic, such that no additional water replenishment assembly is required, thereby simplifying a control system of the product and reducing hardware costs.

In addition, to avoid accidental triggering caused by pet stepping or licking, the water refilling button 18 can be disposed in the cover plate accommodating groove 903, such that the water refilling button 18 can be touched by opening the movable cover 902. By utilizing an idle space of the cover plate accommodating groove 903 to arrange the water refilling button 18, there is no need to form an additional opening in the upper cover 9, thereby simplifying a surface structure of the upper cover 9, shortening a wiring distance between the water refilling button 18 and the control board 11, and improving the stability of electrical connections.

Figure 5:
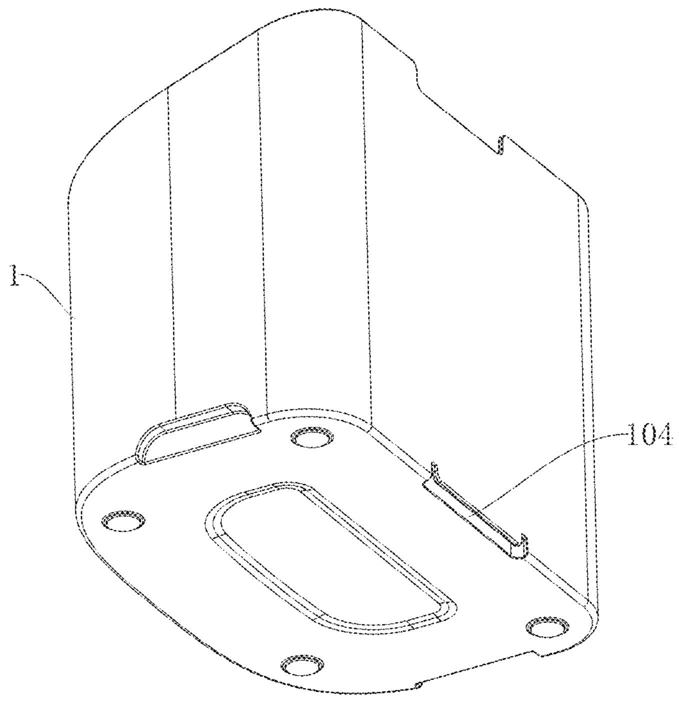
FIG. 5 is a schematic structural diagram of a circulating water tank in the present disclosure.
Figure 8:
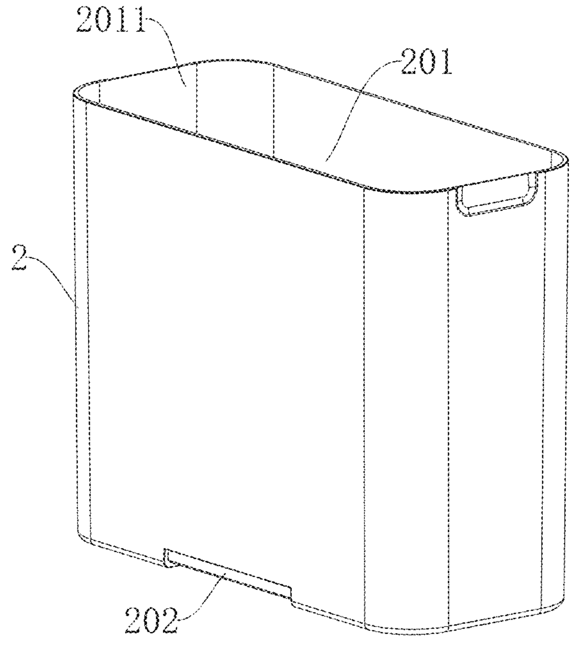
FIG. 8 is a schematic structural diagram of a purified water tank in the present disclosure.
Figure 11:
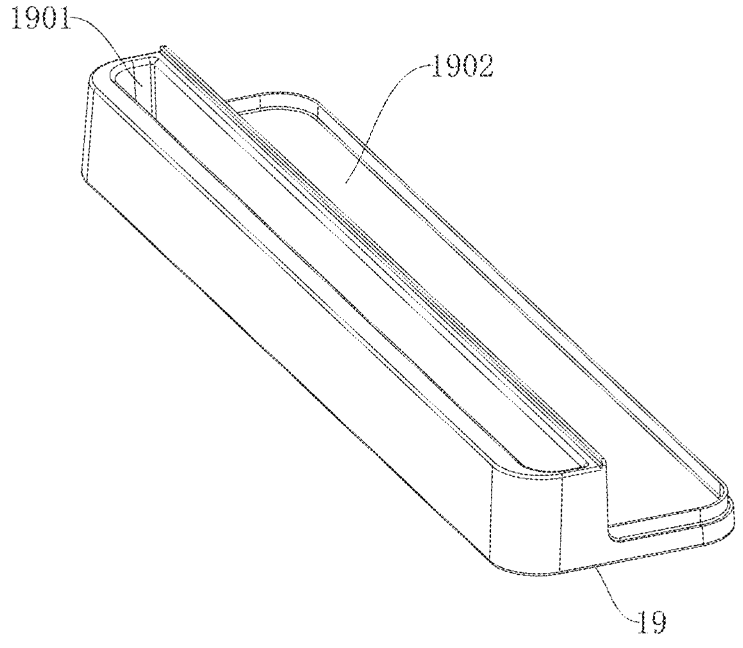
FIG. 11 is a schematic structural diagram of a mounting positioning plate in the present disclosure.

As shown in FIG. 5, FIG. 8, and FIG. 11, in this embodiment, a mounting positioning plate 19 is disposed between a bottom of the circulating water tank 1 and a bottom of the purified water tank 2. Specifically, one end of the mounting positioning plate 19 is provided with a first engaging portion 1901, the other end of the mounting positioning plate 19 is provided with a second engaging portion 1902, a rear side of the bottom of the circulating water tank 1 is provided with a third engaging portion 104 adapted to the first engaging portion 1901, and a front side of the bottom of the purified water tank 2 is provided with a fourth engaging portion 202 adapted to the second engaging portion 1902. The mounting positioning plate 19, through an adaptive connection of the above engaging portions, provides an accurate positioning reference for assembly of the circulating water tank 1 and the purified water tank 2, thereby ensuring that relative positions of the circulating water tank 1 and the purified water tank 2 are fixed, preventing misalignment during assembly, and guaranteeing the alignment accuracy between the water outlet structure 13 and the water tray 3. Moreover, the mounting positioning plate 19 supports and connects the bottom of the circulating water tank 1 and the bottom of the purified water tank 2, thereby dispersing a gravity load of the entire water dispenser, improving the stability of the product when placed on the ground, and preventing tipping. In addition, the engaging connection structure allows for assembly and disassembly of the circulating water tank 1 and the purified water tank 2 without tools, facilitating the keeper to clean the bottoms of the water tanks or to separately disassemble a specific water tank for maintenance.

Figure 13:
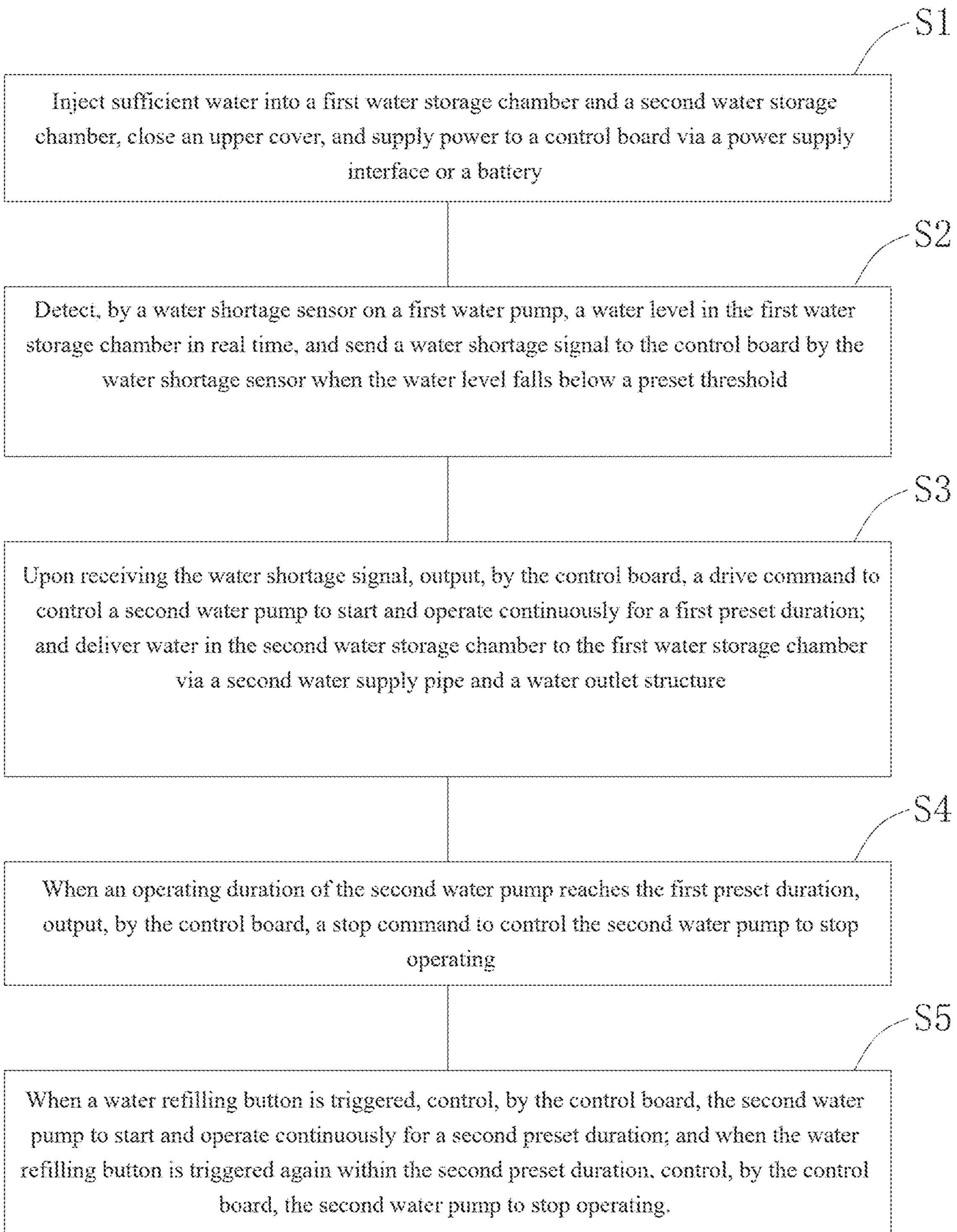
FIG. 13 is a flowchart of an automatic water refilling method for a large-capacity dual-tank pet water dispenser in the present disclosure.

As shown in FIG. 13, in this embodiment, an automatic water refilling method for a large-capacity dual-tank pet water dispenser in the present disclosure includes the following steps.

In step S1, sufficient water is injected into a first water storage chamber 101 of a circulating water tank 1 and a second water storage chamber 201 of a purified water tank 2 to reserve water for circulating water supply and automatic water replenishment; an upper cover 9 is closed to ensure the sealing performance of the purified water tank 2 and prevent impurities from entering; and a control board 11 is powered via a power supply interface 16 or a battery 15. The selection of a dual power supply mode not only supports long-term fixed-position mains power supply, but also allows operation by the battery 15 in case of power failure or movement, thereby ensuring that the water refilling method is not limited by power supply conditions and is applicable to a wider range of scenarios.

In step S2, a water shortage sensor 401 on a first water pump 4 detects a water level in the first water storage chamber 101 in real time, and the water shortage sensor 401 sends a water shortage signal to the control board 11 when the water level falls below a preset threshold. Since the water shortage signal is sent only when the water level falls below the preset threshold, ineffective water replenishment operations are avoided, precise timing for water replenishment is ensured, the water level in the first water storage chamber 101 is maintained within a reasonable range at all times, and continuous drinking water supply for the pet is guaranteed.

In step S3, upon receiving the water shortage signal, the control board 11 outputs a drive command to control a second water pump 10 to start and operate continuously for a first preset duration; and water in the second water storage chamber 201 is delivered to the first water storage chamber 101 via a second water supply pipe 12 and a water outlet structure 13. Upon receiving the water shortage signal, the control board 11 automatically outputs the drive command without manual operation, thereby addressing the pain point of frequent water refilling and making the water dispenser particularly suitable for keepers who need to go out for a short period of time.

In step S4, when an operating duration of the second water pump 10 reaches the first preset duration, the control board 11 outputs a stop command to control the second water pump 10 to stop operating. The operating time of the water pump is controlled by limiting the first preset duration to achieve quantitative water replenishment, thereby preventing the water level in the water tray 3 from becoming excessively high and causing overflow due to continuous water replenishment, and ensuring that each water replenishment operation can meet the requirement for the water level in the first water storage chamber 101 to rise.

In step S5, when a water refilling button 18 is triggered, the control board 11 controls the second water pump 10 to start and operate continuously for a second preset duration; and when the water refilling button 18 is triggered again within the second preset duration, the control board 11 immediately controls the second water pump 10 to stop operating. In a manual trigger mode, temporary water replenishment requirements can be quickly responded to, such as scenarios where the water consumption of the pet increases after intense exercise or fresh and clean water needs to be replaced, thereby improving the convenience of use; moreover, the button can be triggered again within the second preset duration to stop water replenishment, thereby avoiding excessive water replenishment caused by an overly long preset duration, granting the keeper the authority to independently control the water replenishment process, and further reducing water waste.

In summary, the automatic water refilling method in the present disclosure is based on the dual-mode control logic of automatic water shortage-triggered water replenishment and manual button-triggered water replenishment, and is deeply coordinated with a dual-water-tank structure of the water dispenser, the control board 11, and water pump hardware, thereby achieving automation, precision, and convenience in the water replenishment process. By integrating the automatic water replenishment mode and the manual water replenishment mode, the automatic water replenishment mode can maintain the water level without human intervention, thereby solving the problem of drinking water supply for the pet when the user is on a business trip or working overtime; and the manual water replenishment mode can flexibly meet personalized requirements such as a sudden increase in the water consumption of the pet or water replacement. The two modes share a drive assembly, thereby simplifying the control logic and reducing hardware costs. The operating time of the second water pump 10 is limited by controlling the preset duration to accurately control the single water replenishment amount, which not only avoids water shortage caused by insufficient water replenishment but also prevents water overflow caused by excessive water replenishment, thereby improving water resource utilization.

It should be understood that those of ordinary skill in the art can make improvements or transformations based on the above description, and all such improvements and transformations should fall within the scope of protection of the appended claims of the present disclosure.

The present disclosure is described by way of example above with reference to the accompanying drawings. Obviously, the implementation of the present disclosure is not limited by the above way. As long as various improvements are made using the method concept and technical solutions of the present disclosure, or the concept and technical solutions of the present disclosure are directly applied to other occasions without improvement, they are all within the scope of protection of the present disclosure.

What is claimed is:

1. A large-capacity dual-tank pet water dispenser, comprising:

a circulating water tank, wherein the circulating water tank defines a first water storage chamber having a first upper opening, and a water tray is disposed at the first upper opening and provided with a water outlet hole and a drain hole; and a first water pump is disposed at a bottom of the first water storage chamber and integrated with a water shortage sensor, and a water outlet of the first water pump is in fluid communication with the water outlet hole via a first water supply pipe; and a purified water tank, detachably connected to a side of the circulating water tank, wherein the purified water tank defines a second water storage chamber having a second upper opening, the second upper opening is covered by an upper cover, a second water pump and a control board are disposed inside the upper cover, and the control board is configured to control start and stop of the first water pump and the second water pump; a water inlet of the second water pump is connected to a second water supply pipe, and an end of the second water supply pipe away from the second water pump extends to a bottom of the second water storage chamber; a side of the upper cover facing the circulating water tank is provided with a water outlet structure, and a water outlet of the second water pump is in fluid communication with the water outlet structure; and upon receiving a water shortage signal sent by the water shortage sensor, the control board controls the second water pump to start and operate continuously for a first preset duration, such that water stored in the second water storage chamber is delivered to the first water storage chamber sequentially via the second water supply pipe and the water outlet structure;

wherein a water-pouring opening is formed in a middle portion of the upper cover, a movable cover is disposed at the water-pouring opening, and a rear side of the movable cover is rotatably connected to a rear side of a top of the upper cover to enable opening or sealing of the water-pouring opening.

2. The large-capacity dual-tank pet water dispenser according to claim 1, wherein a cover plate accommodating groove is formed in a position of the top of the upper cover corresponding to the movable cover and is in fluid communication with the water-pouring opening; and when the movable cover is rotated into the cover plate accommodating groove, a top of the movable cover is flush with the top of the upper cover.

3. The large-capacity dual-tank pet water dispenser according to claim 1, wherein a front side of the movable cover extends downward to form a front engaging portion; and when the movable cover seals the water-pouring opening, the front engaging portion covers the water outlet structure and forms an engaging cavity together with a front wall of the purified water tank in a surrounding manner, and the engaging cavity is adaptively engaged with a rear wall of the circulating water tank.

4. The large-capacity dual-tank pet water dispenser according to claim 1, wherein the water outlet structure is provided with a water outlet channel, a water inlet of the water outlet channel is in fluid communication with the water outlet of the second water pump via a water outlet pipe, and a water outlet of the water outlet channel faces the circulating water tank.

5. The large-capacity dual-tank pet water dispenser according to claim 1, wherein a battery is further disposed inside the upper cover, another side of the upper cover is provided with a power supply interface, and the control board is respectively electrically connected to the battery and the power supply interface.

6. The large-capacity dual-tank pet water dispenser according to claim 1, wherein the upper cover is provided with a water refilling button, and the water refilling button is electrically connected to the control board;

when the water refilling button is triggered, the control board controls the second water pump to start and operate continuously for a second preset duration; and when the water refilling button is triggered again within the second preset duration, the control board controls the second water pump to stop operating.

7. A large-capacity dual-tank pet water dispenser, comprising:

a circulating water tank, wherein the circulating water tank defines a first water storage chamber having a first upper opening, and a water tray is disposed at the first upper opening and provided with a water outlet hole and a drain hole; and a first water pump is disposed at a bottom of the first water storage chamber and integrated with a water shortage sensor, and a water outlet of the first water pump is in fluid communication with the water outlet hole via a first water supply pipe; and a purified water tank, detachably connected to a side of the circulating water tank, wherein the purified water tank defines a second water storage chamber having a second upper opening, the second upper opening is covered by an upper cover, a second water pump and a control board are disposed inside the upper cover, and the control board is configured to control start and stop of the first water pump and the second water pump; a water inlet of the second water pump is connected to a second water supply pipe, and an end of the second water supply pipe away from the second water pump extends to a bottom of the second water storage chamber; a side of the upper cover facing the circulating water tank is provided with a water outlet structure, and a water outlet of the second water pump is in fluid communication with the water outlet structure; and upon receiving a water shortage signal sent by the water shortage sensor, the control board controls the second water pump to start and operate continuously for a first preset duration, such that water stored in the second water storage chamber is delivered to the first water storage chamber sequentially via the second water supply pipe and the water outlet structure;

wherein a filter cartridge tray is disposed below the water tray, and an overflow channel is formed between the filter cartridge tray and the water tray; and a filter cartridge slot is formed in a middle portion of the filter cartridge tray, a filter cartridge is detachably mounted in the filter cartridge slot, a first through hole in fluid communication with the first water storage chamber is formed in a bottom of the filter cartridge slot, a filter cotton is detachably mounted in the first through hole, and a lower end of the filter cotton extends to a lower end inside the first water storage chamber.

8. The large-capacity dual-tank pet water dispenser according to claim 7, wherein a connecting slot is further formed in the middle portion of the filter cartridge tray, and the filter cartridge slot is formed in a bottom of the connecting slot; and a connecting peripheral plate is protrudingly disposed at a bottom of the water tray and adapted to the connecting slot.

* * * * *